United States Patent [19]

Dedolph

[11] 4,034,507

[45] July 12, 1977

[54] POTTED PLANT ASSEMBLY WITH GROWING PLANT THEREIN

[75] Inventor: Richard R. Dedolph, Naperville, Ill.

[73] Assignee: Gravi-Mechanics Co., Naperville, Ill.

[21] Appl. No.: 603,125

[22] Filed: Aug. 8, 1975

[51] Int. Cl.² .................................. A01G 9/02
[52] U.S. Cl. ............................. 47/66; 71/64 A; 47/84; 260/2.5 R
[58] Field of Search .......................... 264/90–91, 264/101; 47/34, 37, 34.11, 58, 1.2, DIG. 7; 260/2.5; 71/64

[56] References Cited

U.S. PATENT DOCUMENTS

| | | | |
|---|---|---|---|
| 2,965,584 | 12/1960 | Elkin | 47/DIG. 7 |
| 3,373,009 | 3/1968 | Pruitt et al. | 47/37 UX |
| 3,608,238 | 9/1971 | Reuter | 47/1.2 |
| 3,799,755 | 3/1974 | Rack | 47/37 UX |
| 3,812,619 | 5/1974 | Wood et al. | 47/58 |
| 3,834,072 | 9/1974 | Rack | 47/37 |
| 3,878,279 | 4/1975 | Sorrells et al. | 264/101 X |
| 3,899,850 | 8/1975 | Glück et al. | 47/37 |

FOREIGN PATENT DOCUMENTS

1,949,473  4/1971  Germany .............................. 47/1.2

Primary Examiner—Robert E. Bagwill

Attorney, Agent, or Firm—Prangley, Dithmar, Vogel, Sandler & Stotland

[57] ABSTRACT

A potted plant assembly including a container open at the upper end thereof, a body of material filling the container to a predetermined level, a quantity of foam-forming synthetic organic plastic resin distributed throughout the body of material, the quantity of resin being reacted in situ to form an open-celled hydrophilic polymer binding the body of material into a cohesive mass and to the adjacent inner surfaces of the container, a body of foam in the container extending from the predetermined level upwardly adjacent to the upper end of the container, the foam being an open-celled hydrophilic polymer of synthetic organic plastic resin and being secured to the upper surface of the cohesive mass and the adjacent inner surfaces of the container, and a growing plant having the roots thereof substantially uniformly disposed throughout the adjacent portions of the body of foam and the stalk thereof intimately surrounded by the body of foam and extending through the upper surface; also disclosed is a potted plant assembly wherein the plant is disposed in a soil plug that is placed in the cohesive mass and the body of foam; also disclosed are methods of forming such potted plant assemblies.

50 Claims, 13 Drawing Figures

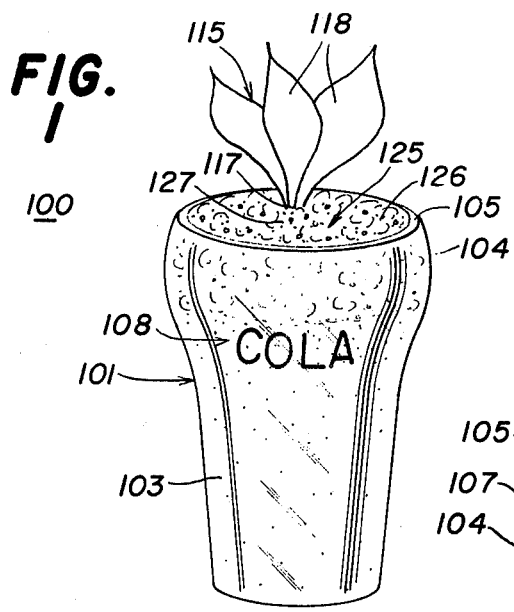
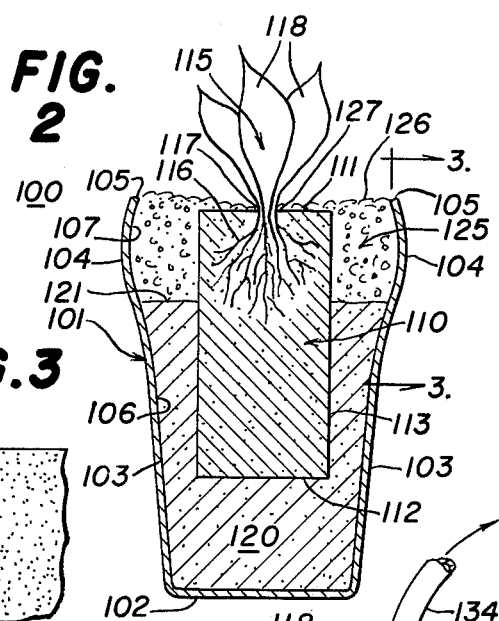
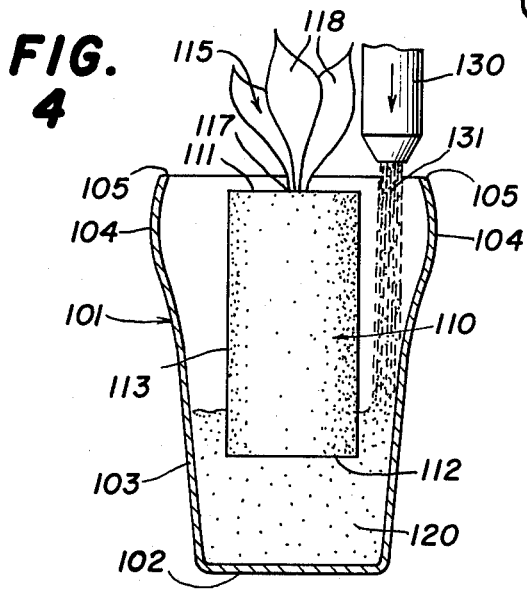
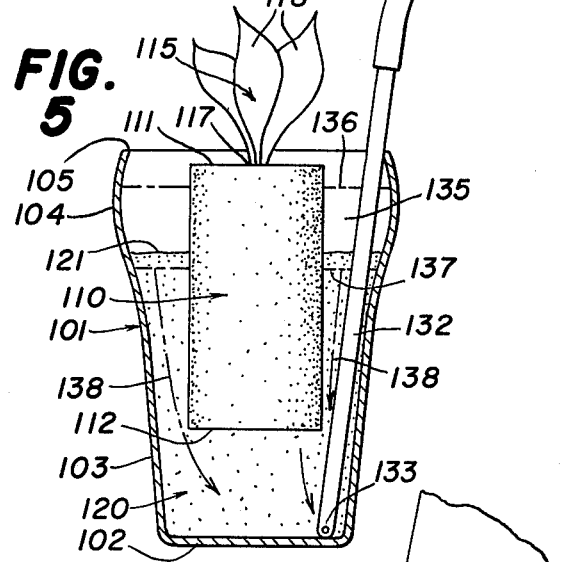
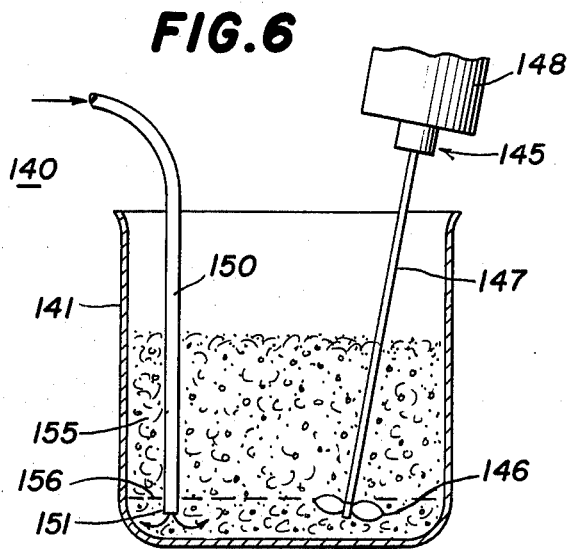
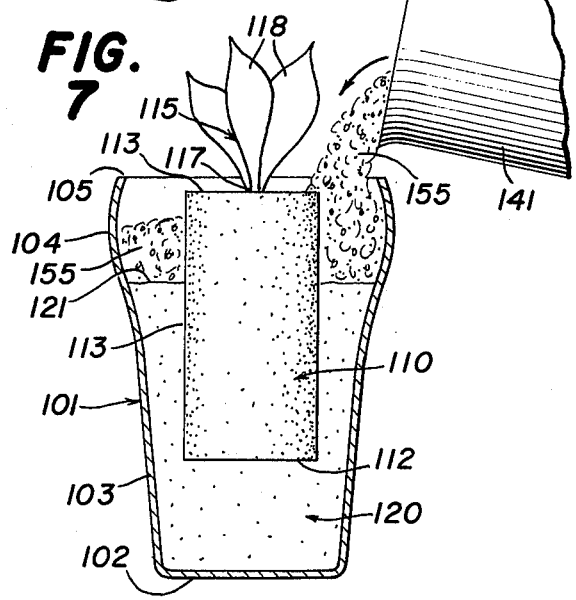

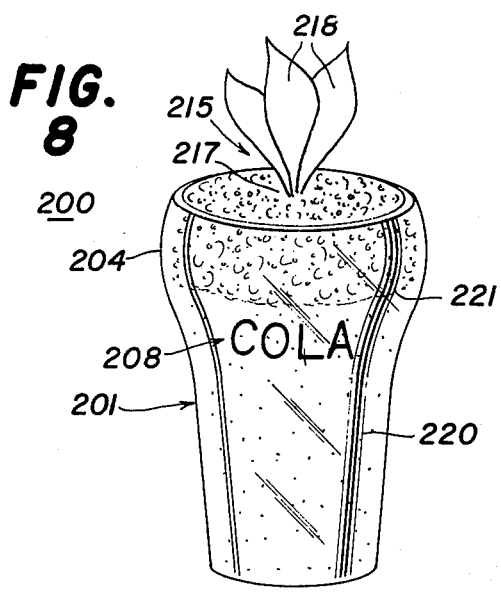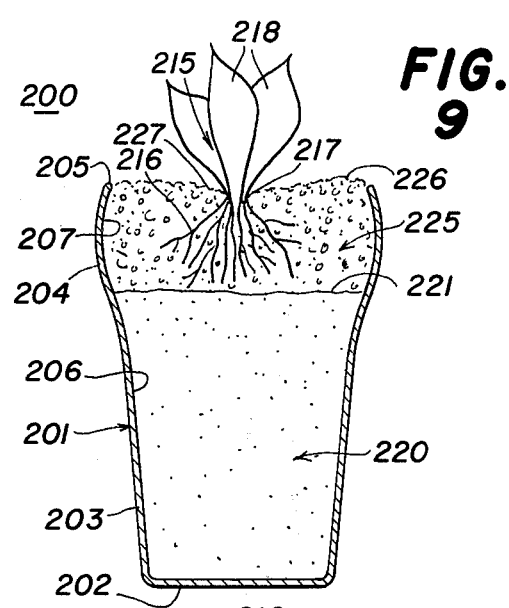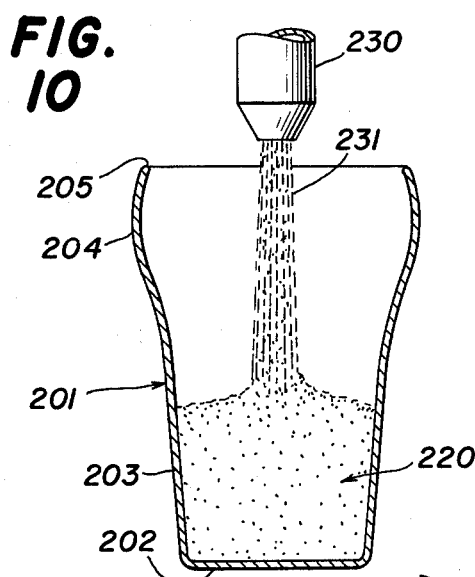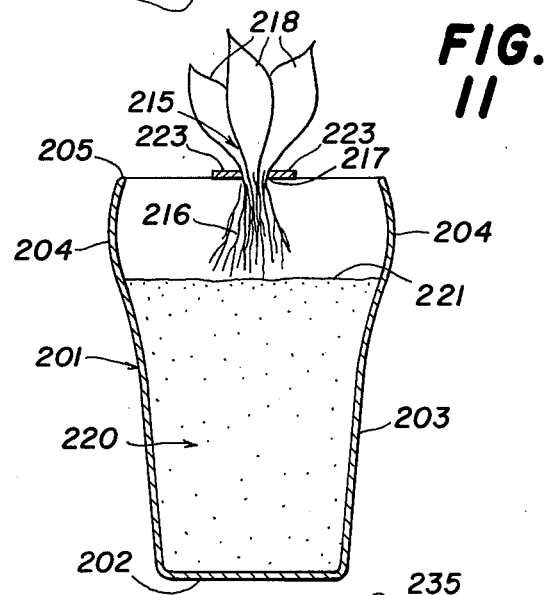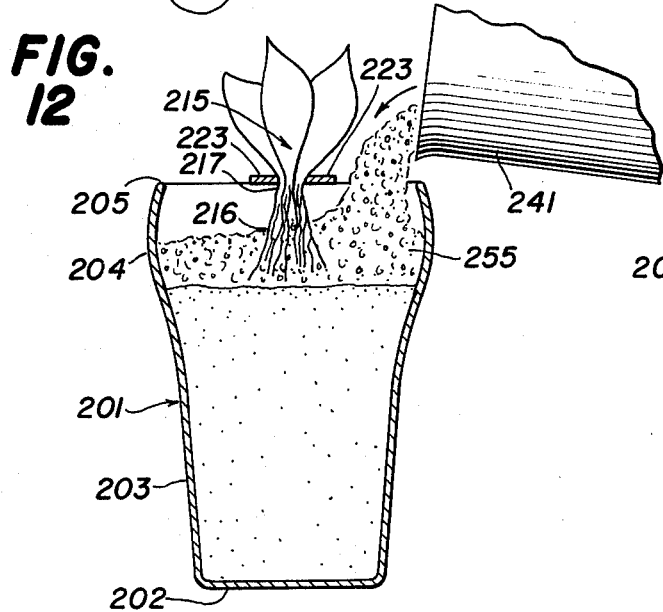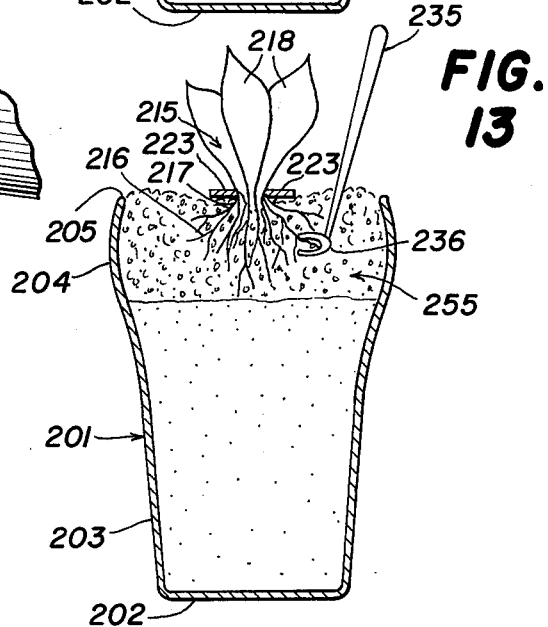

POTTED PLANT ASSEMBLY WITH GROWING PLANT THEREIN

BACKGROUND OF THE INVENTION

The present invention relates generally to improvements in growing and merchandising plants, and specifically to the provision of containers having therein a stabilized body of material with a body of foam disposed thereon and within the container to provide a decorative appearance, a growing plant being provided in the foam, or alternatively in a soil plug disposed in the foam, and to methods of making such potted plant assemblies.

Difficulty has been experienced before in the merchandising of containers with growing plants therein in that the soil for the plant has been inadequate or is in a loosely packed condition, and great care must be exercised in shipping and storing, as well as subsequent handling of such containers.

Such containers also have not been particularly attractive, and therefore difficulty has been encountered in merchandising such prior potted plant assemblies.

SUMMARY OF THE INVENTION

The present invention provides a potted plant assembly having a body of foam in the upper end of the container for the assembly and surrounding a growing plant disposed therein, together with methods of making such potted plant assemblies.

It is an important object of the present invention to provide a potted plant assembly including a container open at the upper end thereof, a body of material filling the container to a predetermined level, a quantity of foam-forming synthetic organic plastic resin distributed throughout the body of material, the quantity of resin being reacted in situ to form an open-celled hydrophilic polymer binding the body of material into a cohesive mass and to the adjacent inner surfaces of the container, a body of foam in the container extending from the predetermined level upwardly adjacent to the upper end of the container, the foam being an open-celled hydrophilic polymer of synthetic organic plastic resin and being secured to the upper surface of the cohesive mass and to the adjacent inner surfaces of the container, and a growing plant having the roots thereof substantially uniformly disposed throughout the adjacent portions of the body of foam and the stalk thereof intimately surrounded by the body of foam and extending through the upper surface thereof.

In connection with the foregoing object, it is another object of the invention to provide a potted plant assembly of the type set forth wherein the plant is disposed in a soil plug that is in turn disposed in the body of material and the body of foam.

Another object of the invention is to provide an assembly of the type set forth wherein the growing plant is omitted from the body of foam.

A further object of the invention is to provide methods of forming potted plants assemblies of the type set forth.

Further features of the invention pertain to the particular arrangement of potted plant assemblies and the disposition of plants therein, and to the particular details of the steps of the methods of forming potted plants assemblies of the type set forth, whereby the above-outlined and additional operating features thereof are attained.

This invention, both as to its organization and method of operation, together with further features and advantages thereof will best be understood with reference to the following specification taken in connection with the accompanying drawings.

BRIEF DESCRIPTION OF THE DRAWINGS

FIG. 1 is a perspective view of a potted plant assembly with a growing plant therein made in accordance with and embodying the principles of the present invention;

FIG. 2 is a view in vertical section through the potted plant assembly of FIG. 1;

FIG. 3 is a fragmentary view of a portion of the inner surface of the container forming a part of the potted plant assembly of FIG. 2 as seen in the direction of the arrows along the line 3—3 thereof;

FIG. 4 is a diagrammatic view illustrating the manner of forming a body of sand around a soil plug during the manufacture of the potted plant assembly of FIG. 1;

FIG. 5 is a diagrammatic view illustrating the manner of infiltrating the stabilizing resin-forming solution into the body of sand forming a part of the potted plant assembly of FIG. 1;

FIG. 6 is a diagrammatic view sowing the method of forming the foam that is a part of the potted plant assembly of FIG. 1;

FIG. 7 is a diagrammatic view illustrating the manner of applying the foam to complete the potted plant assembly of FIG. 1;

FIG. 8 is a perspective view of a second preferred embodiment of a potted plant assembly made in accordance with and embodying the principles of the present invention;

FIG. 9 is the view in vertical section through the potted plant assembly of FIG. 8; and FIGS. 10 to 13 are diagrammatic views illustrating the method of manufacture of the potted plant assembly of FIGS. 8 and 9.

DESCRIPTION OF THE PREFERRED EMBODIMENTS

Referring to FIGS. 1 to 3 of the drawings, there is illustrated a potted plant assembly 100 with a growing plant therein made in accordance with and embodying the principles of the present invention. The assembly 100 includes a container 101 having a circular bottom wall 102 from which upwardly extends a lower side wall 103 which merges with an outwardly extending upper side wall 104 that in turn has an inwardly directed upper edge 105. The container 101 has an inner surface 106 and the upper portion thereof is roughened as at 107, see FIG. 3 particularly. The container 101 is illustrated as being transparent in character, and may be made of glass or plastic, a preferred plastic being a methyl methacrylate plastic which provides good strength, resistance to abrasion and good transparency. There also may be provided on the side walls 103-104 indicia 108, the indicia 108 being on either the outer surface of the side walls or on the inner surface thereof, and may be in the form of an etching of the surface of the side walls, or may be painted thereon, and the like.

Disposed in the container 101 is a soil plug 110 that is generally cylindrical in form and has a top 111, a bottom 112 and a cylindrical side wall 113. Molded in the soil plug 110 is a growing plant 115, the plant 115 including roots 116, a stalk 117 and a top or leaves 118. The roots 116 are distributed in the adjacent portions of the soil plug 110 and are molded therein. The stalk 117 is also molded in the soil plug 110 and extends through the top 111 so that the leaves 118 of the plant 115 are exposed to sunlight in the usual manner.

The soil plug 110 is formed of a spongy open-celled hydrophilic polymer which binds therein a quantity of soil mix, the polymer being a cohesive mass having the soil mix distributed therethrough to form the soil plug 110. The preferred polymer is formed of a synthetic organic plastic resin, such as a polyurethane resin, which provides an open-celled spongy body that is continuous in form and extends throughut the soil plug 110. Such an open-celled polymer securely holds the soil materials in place to prevent loss thereof and to prevent dusting of the surrounding areas, all while providing a good porosity. As a result, the soil plug 110 has a good porosity maintenance capacity, has a good water holding capacity, and the soil mixes are chosen so as to provide a good ion exchange capacity and a good pH buffering capacity in the soil plug 110. Further details concerning the construction of the soil plug 110 and the method of forming the same can be found in my co-pending application for United States Letters Patent, Ser. No. 603,753, filed Aug. 11, 1975, the disclosure of which is incorporated herein by reference.

Disposed above the soil plug 110 and essentially surrounding the same, and specifically the lower portion thereof, is a body of sand or soil mix generally designated by the numeral 120, the body of sand 120 being either uniform in character or in the form of a sand painting that is visible through the transparent walls of the container 101. The sand body 120 terminates in a top surface 121 that is disposed well below the upper edge 105 of the container 101. In accordance with the present invention, the body of sand 120 is bound into a cohesive mass by an open-celled hydrophilic polymer, the preferred polymer being a synthetic organic plastic resin such as a polyurethane resin. Such an open-celled polymer securely holds the sand 120 in place to prevent movement or dislodgement thereof. The method of forming and stabilizing the body of sand 120 in the potted plant assembly 100 is diagrammatically illustrated in FIGS. 4 and 5 of the drawings. Referring to FIG. 4, it will be seen that the container 101 is provided with a portion of the sand 120 in the bottom thereof, after which the soil plug 110 is placed in position and additional sand added. The sand for the body 120 is supplied through a nozzle 130 in a steam 131 to form the body of sand 120. If the body of sand 120 is in the form of a sand painting, then various sand layers having different thicknesses are provided, the layers also having preferably different colors, or at least contrasting shades and textures, so as to provide a pleasant appearance to the body of sand 120. As is best seen in FIG. 5, the top surface 121 of the sand 120 is disposed well below the upper edge 105 of the container 101 and well below the top 111 of the soil plug 110.

The body of sand 120 is stabilized by infiltrating and infusing into the interstices thereof a quantity of synthetic organic plastic resin that is reacted in situ to produce an open-celled hydrophilic polymer. In order to cause the resin solution to be distributed throughout the body of sand 120, a suction probe 132 is utilized to create a vacuum or area of reduced pressure in the bottom of the container 101, thus to draw the resin solution downwardly through the sand 120. The suction probe 132 more particularly has an opening 133 in the lower end thereof which is preferably shaped and has a size slightly less than that of the grains of sand in the body of sand 120. If the sand 120 is a medium sand that has a size approximately 0.25 mm. to about 0.5 mm., then the opening 133 should have a size slightly less than 0.25 mm.; on the other hand, if a fine sand is used in the body of sand 120 having a size of 0.10 mm. to about 0.25 mm., then the opening 133 should be slightly less than 0.10 mm. The upper end of the suction probe 132 is connected by a flexible connection 134 to a source of reduced pressure. Prior to the insertion of the suction probe 132 into the body of sand 120, the surfaces of the suction probe 132 should be coated with a suitable release agent, the preferred release agent comprising lecithin. The lecithin is preferably applied in an alcohol-water solution, 50 grams of lecithin being dissolved in 500 ml. of water, after which 25 ml. of isopropyl alcohol are added to provide the release agent solution. Methyl alcohol, ethyl alcohol and acetone may be utilized in lieu of the isopropyl alcohol in the release agent solution. The release agent solution may be applied to the suction probe 132 by spraying, brushing, diping or the like, after which the solution is allowed to dry, thereby leaving a thin film of lecithin as a release agent on the surfaces of the suction probe 132.

In a separate container there are mixed 89.4 parts of water and 10.6 parts by weight of a polyurethane resin prepolymer solution sold by the 3M Company under the designation "XB-2382", the prepolymer solution being a reaction product of toluene diisocyanate and a polyester having unreacted hydroxyl groups thereon such as polyoxyethylene diol, 66 parts by weight of the prepolymer being dissolved in 34 parts by weight of acetone. Therefore, in the 10.6 parts by weight of the resin solution, 7 parts by weight are resin formers or prepolymer and 3.6 parts by weight are acetone. Further details of the prepolymer are set forth in U.S. Pat. No. 3,805,532 (particularly EXAMPLE 1), and the disclosure thereof is incorporated herein by reference.

When the resin solution and the water are mixed, a milky colloidal dispersion is formed, this colloidal dispersion being identified as a stabilizing resin dispersion 135 in FIG. 5. From FIG. 5 it will be seen that the dispersion 135 is poured onto the top surface 121 of the body of sand 120 and up to point just below the upper edge 104 of the container 101. The dispersion 135 forms an air-tight seal with the inner surfaces of the container 101, and thereafter a vacuum is applied through the suction probe 132, thus drawing the dispersion 135 downwardly into the body of sand 120 as is diagrammatically illustrated by the arrows 138. The advancing lower surface of the resin dispersion 135 can be visually observed progressing downwardly through the body of sand 120, that surface being designated by the numeral 137 in FIG. 5. Just before the dispersion 135 disposed above the top surface 121 is exhausted, additional dispersion 135 is added until the entire body of sand 120 has been infiltrated by the resin dispersion 135. The dispersion 135 is preferably supplied in a volume that is at least 50% of the volume occupied by the body of sand 120 in the container 101. Suction from the suction probe 132 is continued to draw out all excess water and gases until air is drawn, and thereafter the suction probe 132 is removed, thus to complete the potted plant assembly 100.

The resin forming ingredients in the dispersion 135 react in the presence of the water therein to provide a polyurethane resin accompanied by the evolution of carbon dioxide gas, thereby to provide an open-celled hydrophilic polymer as the reaction product. The polymer thus formed permeates the interstices in the body of sand 120 and forms an open-celled network of polyurethane resin. The excess water and the carbon dioxide gas generated during the polymer forming reaction are quickly withdrawn by the suction probe 132, and as a consequence, there is very little foaming of the resin product, other than that required to keep it open-celled and porous. The resultant polymer binds the grains of the body of sand 120 into a cohesive mass, and further secures the resultant cohesive mass to the adjacent inner surfaces of the container 101 and to the adjacent outer surfaces of the soil plug 110.

The temperature at which the resin infusion or infiltration process is carried out may be varied from about 1° C. to about 20° C., the reaction time being inversely proportional to the temperature, i.e., the reaction time being approximately ½ minute at 20° C. and from about 10 minutes to even as much as 20 minutes at 1° C. The weight of polymer utilized in the colloidal dispersion 135 may vary from about 1% by weight to about 10% by weight, a preferred quantity in the example given being 7% by weight.

A sufficient quantity of the resin dispersion 135 is utilized fully to infiltrate the body of sand 120, and as a result slightly more than 2% by weight of polyurethane polymer is provided in the body of sand 120 to stabilize the same, provided that the dispersion 135 has the preferred composition set forth above. It will be appreciated that slightly less polyurethane polymer may be utilized and up to as much as 4% by weight of polyurethane resin maybe so utilized. If too much polymer forming materials are provided in the dispersion 135, the reacted polymer tends to form at the top of the body of sand 120 and to block the same, after which the dispersion 135 foams substantially at the top of the body of sand 120 so as to disturb and even destroy the appearance of the body of sand 120, the upper portion of the body of sand 120 foaming upwardly and over the top of the soil plug 110 and the upper edge 105 of the container 100. The resultant potted plant assembly is unsightly and of no value in the marketplace. Further details of the method of infiltrating a resin forming dispersion into a body of sand are presented in my co-pending application U.S. Ser. No. 603,755, filed Aug. 11, 1975, and the disclosure thereof is incorporated herein by reference.

The method of forming the body of foam 125 is diagrammatically illustrated in FIGS. 6 and 7 of the drawings. Referring first to FIG. 6, a foaming apparatus 140 is illustrated including a container 141, a stirrer 145 and an air tube 150. The stirrer has the usual blade 146 mounted on a shaft 147 and driven by a motor 148. The lower end of the air tube 150 has an outlet 151 which preferably has an opening with a diameter of about 1.5 mm., and has an upper end connected to a source of air under pressure, the pressure being preferably in the range from about 20 inches to about 30 inches of water, the preferred pressure being 25 inches of water. A foaming solution is made by placing 50 ml. of water in the container 141 and adding thereto 25 ml. of a polyurethane resin solution sold by the 3M Company under the designation "XB-2382" described above, the resin solution being a reaction product of toluene diisocyanate and a polyester having unreacted hydroxyl groups thereon, 66 parts by weight of the solids being dissolved in 34 parts by weight of acetone. The resultant solution contains 22 parts by weight of resin formers in an water-acetone solution.

Air is then admitted through the air tube 150 for about 1 minute with operation of the stirrer 145 until foaming starts, at which time the air is turned off, and stirring is continued for about 3 to 4 minutes, or until the initial liquid volume in the container 141 has expanded to 8 times its original volume. The resultant foam mass is designated by the numeral 155 and the original level of liquid is designated by the numeral 156. The foam is then poured from the container 141 into the upper end of the container 101 as is diagrammatically illustrated in FIG. 7, the foam 155 being poured around the upper end of the soil plug 110 and up to and slightly above the upper edge 105 of the container 101 as at 126 in FIG. 2, the foam mass tending to sag downwardly in the center as at 127 around the plant 115. The foam mass 155 continues to react in situ to rigidify and to adhere itself to the top surface 121 of the body of sand 120, to the adjacent inner surfaces of the container 101, and particularly the roughened surface 107, and to the adjacent portions of the soil plug 110 and specifically about the stalk 117 of the plant 115. The reacted foam mass 155 provides the decorative foam 125 that has been described above.

The foam 125 is opened-celled and spongy in character, as well as being hydrohilic. As a result, the plant 115 can be watered through the foam 125, the water passing from the surfaces 126 and 127 and through the foam 125 to the outer surfaces of the soil plug 110 and thence to the roots 116 of the plant 115.

The amount of polyurethane resin-formers in the solution originally placed in the container 141 may vary from about 15% by weight to about 50% by weight, the preferred amount being 22% by weight as in the specific example above. Stirring of the foaming mass may continue until the mass has expanded to from about 5 to about 10 times the initial liquid volume, the foam mass when expanded to 5 times its initial volume comprising fine bubbles while the foam mass expanded to 10 times the initial volume comprising large bubbles. Once placed in the upper end of the container 101, the foam mass sets up in about an additional 5 minutes, i.e. the total elapsed time being about 8 to 10 minutes from the time that the solution is placed in the container 141 until it is fully solidified in the top of the container 101 to form the foam 125. The time required can be altered by changing the temperature at which the foam mass is formed, the reaction time being greater if the temperature is maintained low, i.e. at about 1° c., and longer if the foam mass is formed at a higher temperature. Preferably the foam is formed at a low temperature of about 1° C. to about 10° C. so as to give adequate time for foaming and placement of the foam into the top of the container 101. The foam 125 has an apparent density in the range from about 0.1 to about 0.2 gm. per cc., the apparent density being about 0.1 gm. per cc. when the foam volume is 5 times the volume of the liquid originally placed in the container 141 to form the foam, and the apparent density being about 0.2 gm. per cc. when the foam volume is 10 times the volume of the liquid originally placed in the container 141 to form the foam. With the foam 125 in place and fully reacted, the potted plant assembly 100 is complete.

There is illustrated in FIGS. 8 and 9 of the drawing a second preferred form of a potted plant assembly 200 made in accordance with and embodying the principles of the present invention. The potted plant assembly 200 includes a container 201 that is illustrated as being transparent in character, and may be made of the same material as the container 101 described above. The container 201 includes a bottom wall 202 from which extends upwardly around the outer edge thereof a lower side wall 203, which in turn merges with an upper side wall 204 terminating in an upper edge 205. The inner surface 206 of the container 201 is roughened as at 207, while the outer surface of the container 201 carries a decorative indicia generally designated by the numeral 208.

Disposed in the container 201 is a body of sand generally designated by the numeral 220 that may be in the form of a sand painting to give a decorative and pleasing effect when viewed through the transparent walls of the container 201. The body of sand 220 terminates in a top surface 221 which is spaced downwardly with respect to the upper edge 205 of the container 201.

Disposed upon the top of the body of sand 220 is a body of foam 225 having a plant 125 therein, the body of foam 225 extending from the top surface 121 upwardly and slightly above the upper edge 205 as at 226 but being slightly concave and lower at the inner top surface 227. The roots 216 of the plant 215 are distributed in the adjacent portions of the foam 225 and are molded therein, as will be described more fully hereinafter. The stalk 127 is also molded in the foam 225 but extends through the inner top surface 227 thereof so that the leaves 218 of the plant are exposed to sunlight in the usual manner.

The sand within the body of sand 220 is bound into a cohesive mass by an open-celled hydrophilic polymer, the preferred polymer being a synthetic organic resin such as a polyurethane resin. The open-celled polymer securely holds the sand in the body of sand 220 in place to prevent movement thereof and also to secure the same to the adjacent inner surfaces of the container 201. Diagrammatically illustrated in FIG. 10 is the method of placing the body of sand 220 in the container 201, the sand being provided from a nozzle 230 in a stream 231. The body of and 220 may be in the form of a sand painting having layers of different thicknesses or different colors, or perhaps contrasting shades and textures, so as to provide a pleasant appearance when viewed through the transparent container 201. Sand is added from the nozzle 230 until a predetermined level is reached, the body of sand 220 terminating in a top surface 221 as viewed in FIG. 11.

The plant 215 is then placed in position centrally of the opening in the top of the container 201 and is held therein by a pair of support fingers 233, all as is diagrammatically illustrated in FIG. 11. A quantity of foam 255 is then made in a separate container such as has been described in detail above in respect to FIG. 6, the foam 225 being made in the same manner and having the same characteristics as the foam 155 described above. As is diagrammatically illustrated in FIG. 12, the foam 255 is poured from its container 241 into the top of the container 201 and about the roots 216 of the plant 215. The foam 255 is quickly poured into place, after which the roots 216 are spread therein using a stirrer 235 having a U-shaped end 236 thereon. The stirrer 235 is quickly withdrawn and the support fingers 223 maintained in place while the foam 255 further sets up to provide the body of foam 225 illustrated in FIG. 9. The resultant foam 225 is spongy, open-celled and hydrophilic in character, whereby water applied to the top surfaces 226 and 227 thereof filters therethrough about the roots 216 and any excess falling into the body of sand 2220.

Plants 215 particularly useful in the potted plant assembly 220 of FIGS. 8 and 9 are cacti, sansevieria (the plant illustrated in the drawings), bromeliads and euphorbias.

While there have been described what are at present considered to be certain preferred embodiments of the invention, it will be understood that various modifications may be made therein, and it is intended to cover in the appended claims all such modifications that fall within the true spirit and scope of the invention.

What is claimed is:

1. A potted plant assembly comprising a container open at the upper end thereof, a body of material filling said container to a predetermined level therein, a quantity of foam-forming synthetic organic plastic resin distributed throughout said body of material, said quantity of synthetic organic plastic resin being reacted in situ to form an open-celled hydrophilic polymer binding said body of material into a co-hesive mass and to the adjacent inner surfaces of said container, a body of foam in said container extending from said predetermined level upwardly adjacent to the upper end of said container, said foam being an open-celled hydrophilic polymer of foam-forming synthetic organic plastic resin and being secured to the upper surface of said cohesive mass and to the adjacent inner surfaces of said container, and a growing plant having the roots thereof substantially uniformly disposed throughout the adjacent portions of said body of foam and the stalk thereof intimately surrounded by said body of foam and extending through the upper surface thereof, said body of foam having a density in the range from about 0.1 to about 0.2 gm. per cc.

2. The potted plant assembly set forth in claim 1, wherein said container is transparent.

3. The potted plant assembly set forth in claim 1, wherein said container has the inner surface thereof disposed above said predetermined level roughened to adhere better to said body of foam.

4. The potted plant assembly set forth in claim 1, wherein said body of material is a sand.

5. The potted plant assembly set forth in claim 1, wherein said container has indicia thereon visible to an observer.

6. The potted plant assembly set forth in claim 1, wherein the resin in said body of foam is a polyurethane resin.

7. The potted plant assembly set forth in claim 1, wherein the resin of said foam is a reaction product of toluene diisocyanate with a polyester having unreacted hydroxyl groups thereon and water.

8. The potted plant assembly set forth in claim 1, wherein said growing plant is selected from the group consisting of cacti, euphorbias, sansevieria and bromeliads.

9. A container with foam at the top thereof comprising a container open at the upper end thereof, a body of material filling said container to a predetermined level therein, and a body of foam in said container extending from said predetermined level upwardly adjacent to the upper end of said container, said foam being an open-celled hydrophilic polymer of a foam-forming synthetic organic plastic resin and being secured to the upper surface of said body of material and to the adjacent inner surfaces of said container, said body of foam having a density in the range from about 0.1 to about 0.2 gm. per cc.

10. The container set forth in claim 9, wherein the inner surface of said container above said predetermined level is roughened so as better to adhere to said body of foam.

11. The container set forth in claim 9, wherein said container is transparent.

12. The container set forth in claim 9, wherein said container is formed of plastic.

13. The container set forth in claim 9, wherein said material is a sand stabilized by an open-celled hydrophilic polymer of a foam-forming synthetic organic plastic resin.

14. The container set forth in claim 9, wherein said resin is a polyurethane resin.

15. The container set forth in claim 9, wherein said synthetic organic plastic resin is a reaction product of toluene diisocyanate with a polyester having unreacted hydroxyl groups thereon and water.

16. The container set forth in claim 9, wherein said container has indicia thereon visible to an observer.

17. A potted plant assembly comprising a container open at the upper end thereof, a stabilized soil plug disposed in said container and including a body of spongy polymer containing particles of soil mix, a growing plant having the roots thereof in said body of spongy polymer and having the stalk thereof extending outwardly from one surface of said body of spongy polymer, a body of material in said container and surrounding at least the lower portion of said soil plug and filling said container to a predetermined level therein, a quantity of foam-forming synthetic organic plastic resin distributed throughout said body of material and around the adjacent surfaces of said soil plug, said quantity of synthetic organic plastic resin being reacted in situ to form an open-celled hydrophilic polymer binding said body of material into a cohesive mass and to the adjacent inner surfaces of said container and to the adjacent outer surfaces of said soil plug, and a body of foam in said container extending from said predetermined level upwardly adjacent to the upper end of said container and around the upper end of said soil plug, said foam being an open-celled hydrophilic polymer of a foam-forming synthetic organic plastic resin and being secured to the upper surface of said cohesive mass and to the adjacent outer surfaces of said soil plug.

18. The potted plant assembly set forth in claim 17, wherein the quantity of synthetic organic plastic resin in said body of material comprises from about 2% to about 4% by weight of said body of material.

19. The potted plant assembly set forth in claim 17, wherein said resin in said body of material is a polyurethane resin.

20. The potted plant assembly set forth in claim 17, wherein said resin in said body of material is a reaction product of toluene diisocyanate with a polyester having unreacted hydroxyl groups thereon and water.

21. The potted plant assembly set forth in claim 17, wherein said container is transparent.

22. The potted plant assembly set forth in claim 17, wherein said container has the inner surface thereof disposed above said predetermined level roughened to adhere better to said body of foam.

23. The potted plant set forth in claim 17, wherein said container has indicia thereon visible to the observer.

24. The potted plant set forth in claim 17, wherein said body of foam has a density in the range from about 0.1 to about 0.2 gms. per cc.

25. A method of forming a container with foam at the top thereof comprising the steps of providing a fluid-tight container open at the upper end thereof, placing a body of material in said container to a predetermined level therein, distributing a first quantity of foam-forming synthetic organic plastic resin in solution throughout said body of material, reacting said synthetic organic plastic resin in situ to form an open-celled hydrophilic polymer binding said body of material into a cohesive mass and to the adjacent inner surfaces of said container, forming a body of partially reacted foam from a second quantity of foam-forming synthetic organic plastic resin partially reacted to form an open-celled hydrophilic polymer containing air bubbles therein and being partially self-supporting, placing said body of partially reacted foam in said container on top of said cohesive mass and filling said container from said predetermined level upwardly adjacent to the upper end thereof, and thereafter fully reacting said second quantity of synthetic organic resin in said body of foam in situ to form an open-celled hydrophilic polymer secured to the upper surface of said cohesive mass and to the adjacent inner surfaces of said container.

26. The method of forming a container with foam at the top thereof as set forth in claim 25, wherein said first quantity of resin comprises from about 2% to about 4% of said cohesive mass.

27. The method of forming a container with foam at the top thereof as set forth in claim 25, wherein said first quantity of synthetic organic plastic resin is a polyurethane resin.

28. The method of forming a container with foam at the top thereof as set forth in claim 25, wherein said first quantity of synthetic organic plastic resin is a reaction product of toluene diisocyanate with a polyester having unreacted hydroxyl groups thereon and water.

29. The method of forming a container with foam at the top thereof as set forth in claim 25, wherein said first quantity of synthetic organic plastic resin is supplied as a dispersion in water and forms a liquid seal across the upper end of said container, and said first quantity of resin is distributed throughout said body of material by applying a vacuum to the lower portion of said container to draw said dispersion downwardly throughout said body of material.

30. The method of forming a container with foam at the top thereof as set forth in claim 29, wherein the volume of said dispersion is at least 50% of the volume of said body of material in said container.

31. The method of forming a container with foam at the top thereof as set forth in claim 29, wherein said dispersion comprises about 1% to about 10% by weight of resin-forming materials.

32. The method of forming a container with foam at the top thereof as set forth in claim 29, wherein said dispersion has a temperature at the time of application to said container in the range from about 1° C. to about 10° C.

33. The method of forming a container with foam at the top thereof as set forth in claim 29, wherein the vacuum applied to said container is in the range from about 5 inches to about 50 inches of water.

34. The method of forming a container with foam at the top thereof as set forth in claim 25, wherein said second quantity of resin is provided in an aqueous solution comprising from about 15% to about 50% by weight of resin-forming material.

35. The method of forming a container with foam at the top thereof as set forth in claim 34, wherein air bubbled through said second quantity of resin at a pressure of about 20 inches to about 30 inches of water to aid in forming said body of foam.

36. The method of forming a container with foam at the top thereof as set forth in claim 34, wherein said body of foam has a volume from about 5 to about 10 times the original volume of the aqueous solution of resin-forming materials.

37. A method of forming a container with foam at the top thereof comprising the steps of providing a fluid-tight container open at the upper end thereof, placing a body of material in said container to a predetermined level therein, distributing a first quantity of foam-forming synthetic organic plastic resin in solution throughout said body of material, reacting said synthetic organic plastic resin in situ to form an open-celled hydrophilic polymer binding said body of material into a cohesive mass and to the adjacent inner surfaces of said container, forming a body of partially reacted foam from a second quantity of foam-forming synthetic organic plastic resin partially reacted to form an open-celled hydrophlic polymer containing air bubbles therein and being partially self-supporting, placing said body of partially reacted foam in said container on top of said cohesive mass and filling said container from said predetermined level upwardly adjacent to the upper end thereof, placing the roots and the lower portion of the stalk of a growing plant in said body of partially reacted foam, and thereafter fully reacting said second quantity of synthetic organic plastic resin in said body of foam in situ to form an open-celled hydrophilic polymer with said growing plant therein and secured to the upper surface of said cohesive mass and to the adjacent inner surfaces of said container, said growing plant having the roots thereof substantially uniformly disposed throughout the adjacent portions of said body of foam and the stalk thereof intimately surrounded by said body of foam and extending through the upper surface thereof.

38. The method of forming a container with foam at the top thereof as set forth in claim 37, and further comprising the steps of distributing the roots of the growing plant in said body of foam.

39. A method of forming a container with foam at the top thereof comprising the steps of providing a fluid-tight container open at the upper end thereof, placing a soil plug with a growing plant therein in said container, placing a body of material in said container and around at least the lower portion of said soil plug to a predetermined level in said container, distributing a first quantity of foam-forming synthetic organic plastic resin in solution throughout said body of material, reacting said synthetic organic plastic resin in situ to form an open-celled hydrophilic polymer binding said body of material into a cohesive mass and to the adjacent inner surfaces of said container and the the adjacent outer surfaces of said soil plug, forming a body of partially reacted foam from a second quantity of foam-forming synthetic organic plastic resin partially reacted to form an open-celled hydrophilic polymer containing air bubbles therein and being partially self-supporting, placing said body of partially reacted foam in said container on top of said cohesive mass and around the upper end of said soil plug and filling said container from said predetermined level upwardly adjacent to the upper end thereof, and thereafter fully reacting said second quantity of synthetic organic plastic resin in said body of foam in situ to form an open-celled hydrophilic polymer secured to the upper surface of said cohesive mass and to the adjacent outer surfaces of said soil plug.

40. The method of forming a container with foam at the top thereof as set forth in claim 39, wherein said first quantity of resin comprises from about 2% to about 4% of said cohesive mass.

41. The method of forming a container with foam at the top thereof as set forth in claim 39, wherein said first quantity of synthetic organic plastic resin is a polurethane resin.

42. The method of forming a container with foam at the top thereof as set forth in claim 39, wherein said first quantity of synthetic organic plastic resin is a reaction product of toluene diisocyanate with a polyester having unreacted hydroxyl groups thereon and water.

43. The method of forming a container with foam at the top thereof as set forth in claim 39, wherein said first quantity of synthetic organic plastic resin is supplied as a dispersion in water and forms a liquid seal across the upper end of said container, and said first quantity of resin is distributed throughout said body of material by applying a vacuum to the lower portion of said container to draw said dispersion downwardly throughout said body of material.

44. The method of forming a container with foam at the top thereof as set forth in claim 43, wherein the volume of said dispersion is at least 50% of the volume of said body of material in said container.

45. The method of forming a container with foam at the top thereof as set forth in claim 43, wherein said dispersion comprises about 1% to about 10% by weight of resin-forming materials.

46. The method of forming a container with foam at the top thereof as set forth in claim 43, wherein said dispersion has a temperature at the time of application to said container in the range from about 1° C. to about 10° C.

47. The method of forming a container with foam at the top thereof as set forth in claim 43, wherein the vacuum applied to said container is in the range from about 5 inches to about 50 inches of water.

48. The method of forming a container with foam at the top thereof as set forth in claim 39, wherein said second quantity of resin is provided in an aqueous solution comprising from about 15% to about 50% by weight of resin-forming material.

49. The method of forming a container with foam at the top thereof as set forth in claim 48, wherein air is bubbled through said second quantity of resin at a pressure of about 20 inches to about 30 inches of water to aid in forming said body of foam.

50. The method of forming a container with foam at the top thereof as set forth in claim 48, wherein said body of foam has a volume from about 5 to about 10 times the orignal volume of the aqueous solution of resin-forming materials.

* * * * *

UNITED STATES PATENT AND TRADEMARK OFFICE
CERTIFICATE OF CORRECTION

PATENT NO. : 4,034,507

DATED : July 12, 1977

INVENTOR(S) : Richard R. Dedolph

It is certified that error appears in the above-identified patent and that said Letters Patent are hereby corrected as shown below:

Column 2, line 25, "sowing" should be --showing--.
Column 3, line 12, "throughut" should be --throughout--.
Column 4, line 22, "diping" should be --dipping--.
Column 6, line 27, "hydrohilic" should be --hydrophilic--.
Column 7, line 20, "125" should be --215--;
        line 21, "121" should be --221--;
        line 27, "127" should be --217--;
        line 41, "and" should be --sand--;
        line 55, "225" should be --255--.
Column 8, line 2, "2220" should be --220--.
Column 10, line 23, after "organic" insert --plastic--.
Column 11, line 26, "hydrophlic" should be --hydrophilic--;
        line 60, "the" first occurrence should be --to--.
Column 12, lines 16 & 17, "polurethane" should be --polyurethane--;
        line 63, "orignal" should be --original--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks